United States Patent

[11] 3,601,024

| [72] | Inventor | Armin B. Pagel<br>Janesville, Wis. |
|---|---|---|
| [21] | Appl. No. | 730,792 |
| [22] | Filed | May 21, 1968 |
| [45] | Patented | Aug. 24, 1971 |
| [73] | Assignee | Eastman Kodak Company<br>Rochester, N.Y. |

[54] EXPOSURE-ADJUSTING SYSTEM FOR STILL OR MOTION-PICTURE CAMERAS
2 Claims, 11 Drawing Figs.

[52] U.S. Cl. .................................................. 95/31 FS,
95/10 C, 352/72
[51] Int. Cl. ....................................................G03b 19/04,
G03b 17/20
[50] Field of Search............................................ 95/10, 31,
11.5; 352/72, 78

[56] References Cited
UNITED STATES PATENTS

| 3,208,363 | 9/1965 | Easterly.......................... | 95/11.5 X |
| 3,260,182 | 7/1966 | Nerwin........................... | 95/10 X |
| 3,276,340 | 10/1966 | Nerwin........................... | 95/31 |
| 3,309,975 | 3/1967 | Kremp........................... | 95/10 |
| 3,312,158 | 4/1967 | MacMillin...................... | 95/10 |
| 3,388,648 | 6/1968 | Thiele............................ | 95/10 X |
| 3,421,422 | 1/1969 | Winkler.......................... | 352/72 X |
| 3,444,798 | 5/1969 | Mavr.............................. | 95/31 X |
| 3,470,799 | 10/1969 | Engelsmann et al.......... | 95/31 X |
| 3,481,259 | 12/1969 | Langnau et al................ | 95/10 C |
| 3,495,901 | 2/1970 | Neudecker et al............ | 95/10 C X |
| 3,444,795 | 5/1969 | Nerwin........................... | 95/10 X |
| 3,485,157 | 12/1969 | Nerwin........................... | 352/78 X |
| 3,491,670 | 1/1970 | Rentschler..................... | 95/31 FS |

FOREIGN PATENTS

| 1,110,906 | 4/1968 | Great Britain................. | 95/10 |

*Primary Examiner*—Samuel S. Matthews
*Assistant Examiner*—Russell E. Adams, Jr.
*Attorneys*—R. W. Hampton and Daniel E. Sragow ABSTRACT: A photographic or cinematographic camera including a mechanism adjustable by coding means on a film container includes means for also adjusting that mechanism manually and a signal device for alerting the operator of the necessity for such manual adjustment whenever the film container loaded into the camera is not coded in a manner compatible with such automatic adjustment.

Patented Aug. 24, 1971
3,601,024
2 Sheets-Sheet 1
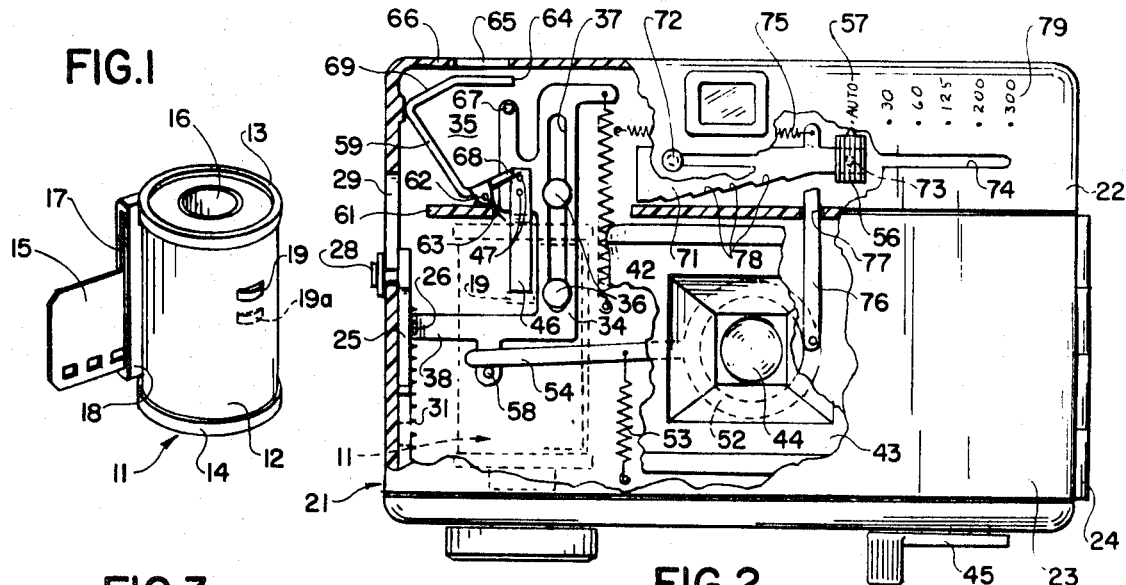
FIG.1
FIG.2
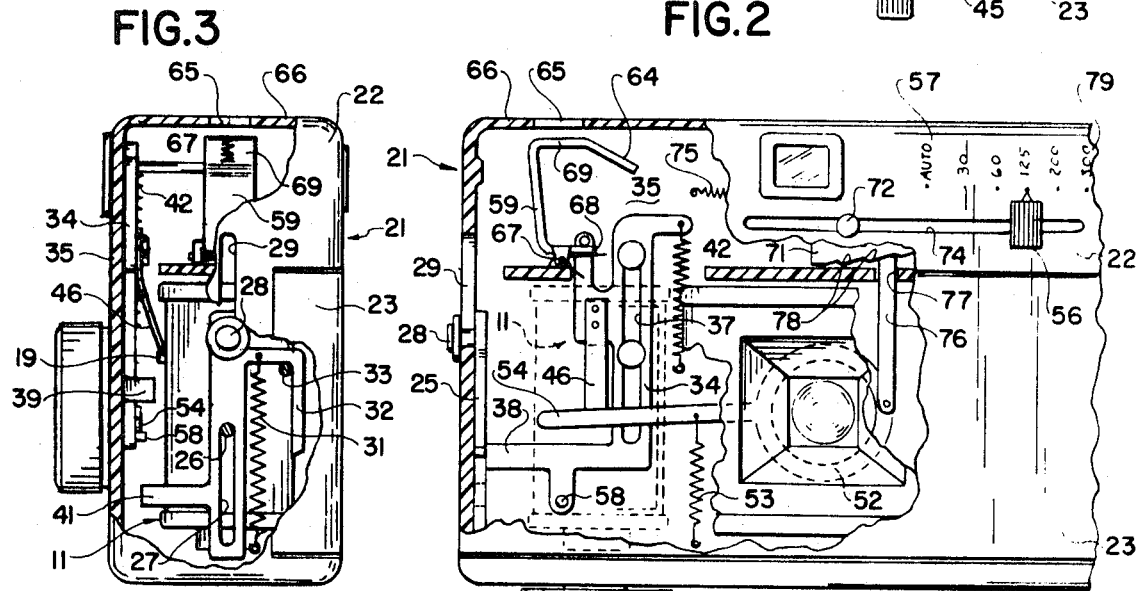
FIG.3
FIG.4
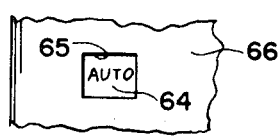
FIG.5
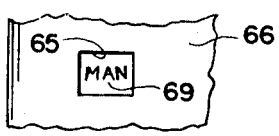
FIG.6
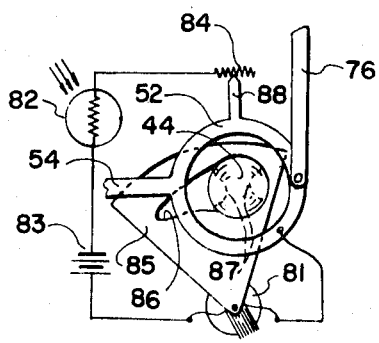
FIG.7
ARMIN B. PAGEL
INVENTOR.
BY Daniel E. Sragow
Robert W. Hampton
ATTORNEYS

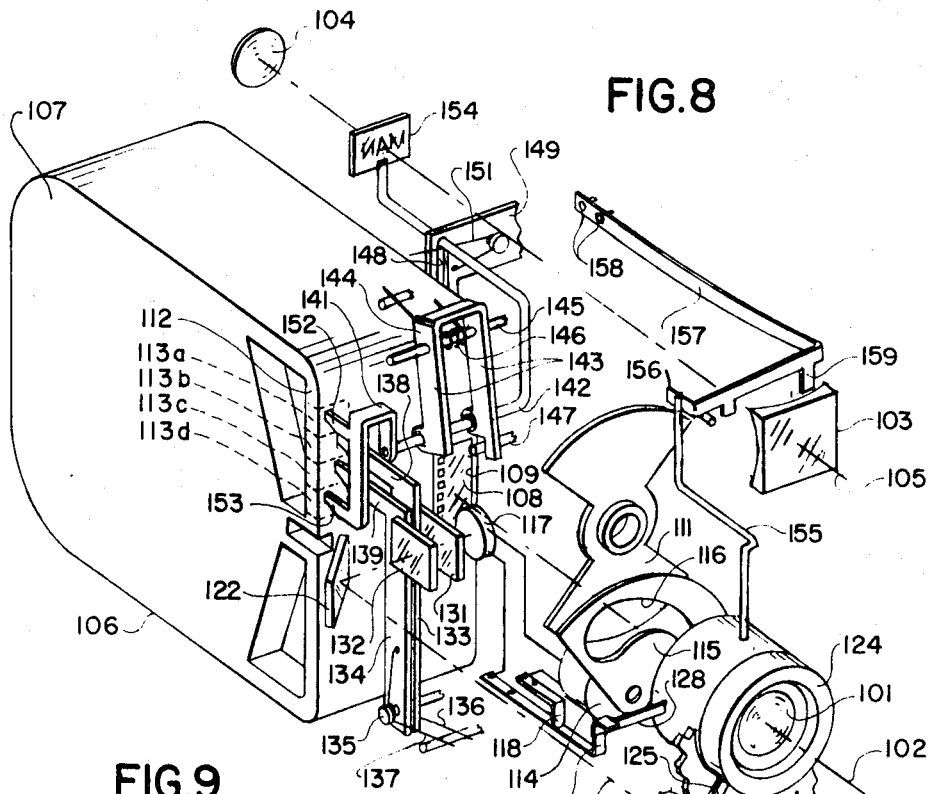
FIG.8
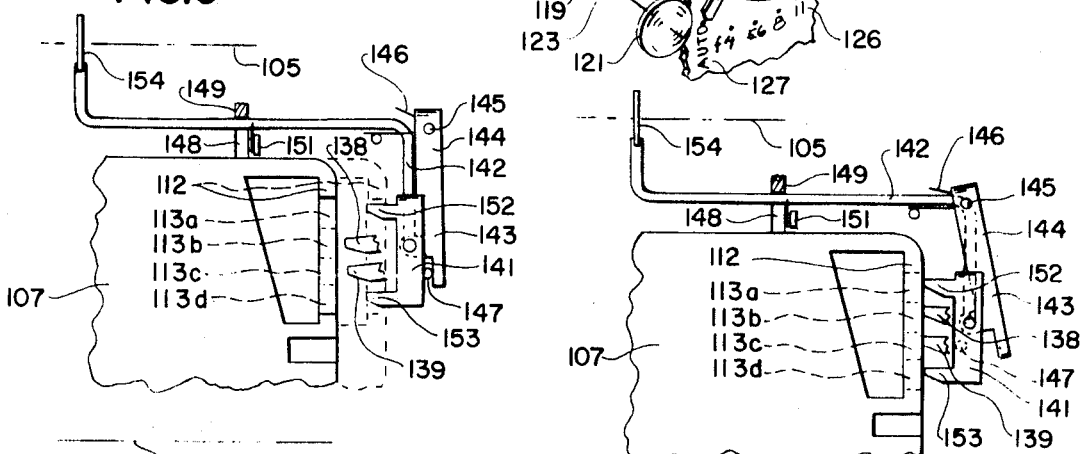
FIG.9
FIG.10
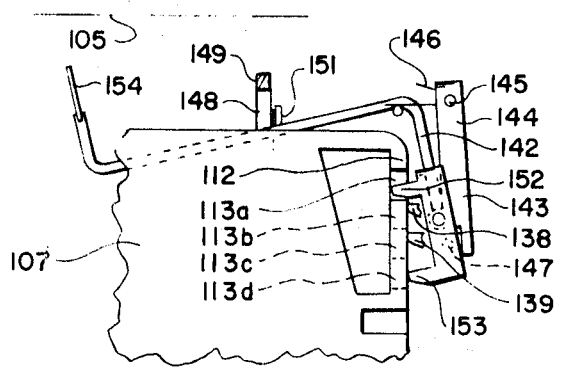
FIG.11
ARMIN B. PAGEL
*INVENTOR.*
BY Daniel E. Sagan
Robert W. Hampton
ATTORNEYS

EXPOSURE-ADJUSTING SYSTEM FOR STILL OR MOTION-PICTURE CAMERAS

REFERENCES TO RELATED APPLICATIONS

Reference is hereby made to copending application Ser. No. 730,791 now abandoned filed of even date herewith in the name of John H. Eagle.

BACKGROUND OF THE INVENTION

1. Field of the Invention

The present invention relates to photographic or cinematographic cameras adapted to be loaded with film containers which may be provided with coding means indicative of a characteristic of the film therein, such cameras including a mechanism for sensing said coding means and automatically adjusting an exposure-regulating device in accordance therewith. More particularly, the invention provides means for alerting the operator to the fact that he has loaded such a camera with a film container which is either uncoded or is coded in a manner incompatible with said mechanism, and for allowing an appropriate manual adjustment of the exposure-regulating device to be made accordingly.

2. Description of the Prior Art

It is well known in the prior art to provide a camera with means for automatically adjusting an exposure control device in response to coding means provided on a film container in accordance with a sensitivity characteristic of the film supplied thereby. However, if such a camera is loaded with a film magazine or other appropriate film container which is not provided with such coding means, it is obvious that no automatic adjustment of the exposure control device will be effected. Likewise, in a particular camera, the automatic adjustment means will fail to perform its intended function even though the camera be loaded with a coded film container, if the film supplied thereby is of a sensitivity beyond the operating range of such automatic adjusting means.

To prevent such failure of the automatic adjusting means, certain prior art cameras of this type have included film container compartments adapted to accommodate only those film containers coded in a manner compatible with the automatic adjustment mechanism embodied therein. The disadvantage of this arrangement is that it encourages an inexperienced operator to attempt to force an inappropriate film container into the camera, which will very likely result in serious damage to the camera structure. Accordingly, German Pat. No. 1,229,381, published on Nov. 24, 1966, contemplates providing such a camera, instead, with a signal member movable into view in the viewfinder whenever the camera is loaded with an uncoded or inappropriately coded film container. Thus, the appearance of the signal member in the viewfinder informs the operator that the film container must be replaced with an appropriately coded one in order to render the camera properly operable.

With a camera provided with either of the above-described arrangements for alerting the operator at the attempted use of a film container which will not produce an appropriate exposure control adjustment, the only remedy for this situation is to reload the camera with a suitable coded film container.

SUMMARY OF THE INVENTION

In order to avoid this stringent limitation, a camera according to the present invention likewise embodies means for indicating the absence of film container coding means capable of automatically effecting a proper adjustment of the exposure control device; but is also provided with means for manually adjusting that device in accordance with film sensitivities within a range which may exceed that of the automatic adjustment means. Additionally, the present invention also provides means for insuring automatically that this manual adjustment feature will not accidentally be employed in a manner that might interfere with the proper operation of the automatic adjusting means when the camera is loaded with an appropriately coded film container.

Various means for practicing the invention and other advantages and features thereof will be apparent from the following detailed description of illustrative preferred embodiments thereof, reference being made to the accompanying drawings in which like reference characters refer to like elements.

BRIEF DESCRIPTION OF THE DRAWINGS

In the accompanying drawings:

FIG. 1 is a perspective view of a film container in the form of a so-called film cassette, showing a representative means of coding the container in accordance with the sensitivity of the film therein;

FIG. 2 is a rear elevational view of a camera loaded with a coded film container corresponding to the one shown in FIG. 1 and embodying a mechanism according to a preferred embodiment of the invention, said camera being depicted with portions thereof broken away to illustrate internal components of that mechanism;

FIG. 3 is an end elevational view of the camera shown in FIG. 2 with external portions of the camera likewise broken away to depict internal components of the camera;

FIG. 4 corresponds to FIG. 2 and depicts the same camera loaded with an uncoded film container of the same type shown in FIG. 1;

FIG. 5 is a partial top plan view of the camera shown in FIGS. 2—4, showing the signal visible to the camera operator when the camera is loaded with a film container coded in a manner adapted to effect automatic adjustment of the camer's exposure control device;

FIG. 6 corresponds to FIG. 5 and illustrates the signal visible to the camera operator whenever the camera is loaded with a film container which is not coded in a manner adapted to effect a proper adjustment of the camer's exposure control device;

FIG. 7 is a schematic view of a photosensitive exposure-regulating system adapted to be adjusted in accordance with different film sensitivities by a mechanism of the type embodied in the camera shown in FIGS. 2—6;

FIG. 8 is a perspective representation of the basic operative elements of another preferred embodiment of the invention incorporated in a motion-picture camera adapted to be loaded with a coded film container;

FIG. 9 is a partial side elevational view of the motion-picture camera structure shown in FIG. 9, illustrating the position of the viewfinder signal mechanism when the camera is empty or loaded with a coded film container provided with film of a sensitivity beyond the range of automatic adjustment of the camera's exposure control system;

FIG. 10 corresponds to FIG. 9 and illustrates the position of the viewfinder signal mechanism when the camera is loaded with an uncoded film container; and FIG. 11 corresponds to FIGS. 9 and 10 and illustrates the position of the viewfinder signal mechanism when the camera is loaded with a film container coded in accordance with film sensitivity within the range of automatic adjustment of the camera's exposure control system.

DESCRIPTION OF THE ILLUSTRATIVE PREFERRED EMBODIMENTS

Referring first to FIG. 1, the illustrated film container 11, per se, is representative of a conventional film cassette of the type customarily used to supply 35 mm. camera film. Such a cassette comprises a casing 12 closed at its opposite ends by caps 13 and 14. A strip of film 15 is wound onto a core member 16 within the cassette and is withdrawn therefrom through a lighttight slot 17 in the tangential lip portion 18 of the casing.

The coding means provided on the illustrated film cassette comprises a protuberance 19 formed on the wall of the casing in a predetermined angular relation to the tangential lip at an axial position determined in accordance with the sensitivity of the film in the cassette, i.e. the film "speed." For example, the axial position of the illustrated protuberance on cassette 11 will be considered to represent an intermediate film speed coded in accordance with a code system by which progressively greater spacing between the protuberance and upper end cap 13 characterizes corresponding progressively slower film speeds.

The camera 21 shown in FIGS. 2 through 6 comprises a generally boxlike housing 22 closed by a cover door 23 attached thereto by a hinge 24. At the end of housing 22 opposite hinge 24, an internal cover latch slide 25 is supported for vertical sliding movement by a stationary pin 26 extending through a slot 27 in the slide and by a slide button 28 projecting through slot 29 in the camera housing. The latch slide is urged downwardly by a spring 31 to a position best shown in FIG. 3, in which latch arm 32 is engaged behind pin 33 on the cover door to retain the door in its closed position.

To allow the cover door to be opened, the latch slide is moved upwardly against the resistance of spring 31 by means of the slide button to disengage latch arm 32 from pin 33. As the door is closed, the latch slide must likewise be moved to the same raised position in order that pin 33 can be reengaged by the latch arm. Alternatively, the latch slide can be held in its raised position by a catch device, not shown, which is releasable in response to closing the cover door; such devices being commonly employed in various types of cameras to eliminate the need for a second manual operation of the latch mechanism as the cover door is being closed.

A code sensing slide 34 is supported for vertical sliding movement against the internal surface of the front wall member 35 of the camera housing by support studs 36 extending through elongate slot 37. At the bottom of the code-sensing slide, lateral arm 38 thereof is provided with an ear 39 located directly above the end of horizontal leg 41 of the latch slide. Accordingly, when the latch slide is moved to its raised position to allow the cover door to be opened or closed, the code sensing slide is also moved to its upper-most position against the resistance of spring 42, which urges the code sensing slide downwardly.

To load the camera, the cover door is opened and while the cover latch slide 25 is held in an upward position, a film cassette of the type shown in FIG. 1 is installed in a compartment, not shown, which positions the cassette as depicted in solid lines in FIG. 3 and in broken lines in FIGS. 2 and 4. As in most cameras of the same general type, the leading end of the strip of film 15 is then partially withdrawn from the cassette and is attached to a takeup member, not shown, whereby the film can be advanced intermittently along support surface 43 past the camera lens system 44 by manual operation of film advancing lever 45.

With the film cassette so positioned in the camera, and when the cover latch slide 25 is released, the coding portion of the cassette casing surface is located in contact with the lower end of a resilient sensing finger 46 attached to sensing slide 34 by rivets 47. When the sensing slide is raised to its uppermost position by latch slide 25, the sensing finger is located slightly above the position shown in FIGS. 2 and 3. As the latch slide is moved downwardly to lock the cover door, however, the sensing slide likewise moves downwardly under the influence of spring 42 to a position defined by the engagement of the lower end of finger 46 with the coding protuberance 19 on the cassette. Thus, the vertical position of the code sensing slide shown in FIGS. 2 and 3 corresponds to a particular relatively high film speed reflected by the illustrated position of protuberance 19; whereas the lower position of the protuberance shown at 19a in FIG. 1 would indicate a lower film speed and would effect a correspondingly lower position of the code sensing slide, and so on. However, if the cassette is not coded or if the speed of the film therein is such that the coding protuberance is positioned beyond the path of movement of the sensing finger, the sensing slide will be moved downwardly by spring 42 to its lowermost position shown in FIG. 4. Alternatively, similar movement of the sensing slide could be effected in response to movement of the cover door, as disclosed for example in commonly assigned U.S. Pat. No. 3,260,182 issued in the name of Hubert Nerwin on July 12, 1966.

The illustrated camera is provided with a conventional nonadjustable shutter, not shown, which for illustrative purposes will be considered to produce an exposure of one one-hundredth of a second. In combination with this fixed speed shutter, the exposure control device of the camera is adapted to vary the effective aperture of the camera lens system by means of a conventional variable diaphragm, not shown. To adjust the aperture opening, the diaphragm, is connected to aperture control ring 52 in a manner such that the aperture is decreased by clockwise rotation of the ring, as viewed in FIGS. 2 and 4, and increased by counterclockwise rotation of the ring. An aperture adjusting spring 53 exerts a downward force on control arm 54 of the aperture control ring 52, thereby constantly biasing that ring in a counterclockwise direction.

In order that the exposure control device will be adjusted automatically in response to the code protrusion on a film cassette, manual aperture control button 56 is aligned with the symbol "AUTO" shown at 57 to disable the hereinafter-described manual aperture adjustment mechanism from influencing the adjustment of the diaphragm. Thus, since the position of the sensing slide will be established as a function of the film speed whenever the camera is loaded with a cassette having a coding protrusion within the path of movement of finger 46, the aperture will be adjusted accordingly by virtue of the engagement of the end of control arm 54 with sensing slide pin 58 under the influence of spring 53. Therefore, for a predetermined average light condition, the exposure produced by the lens system will be properly related to the film in the cassette as the case of simple box cameras intended to use film of only one particular speed.

A signal member 59 is pivotally mounted to internal wall member 61 of the camera by a pin 62 and is biased toward the position shown in FIG. 2 by a light hairpin spring 63. In this position, the upper end portion 64 of the signal member is aligned directly below window 65 in the upper wall 66 of the camera housing so that the work "AUTO" on that portion of the signal member is visible to the camera operator as shown in FIG. 5. Whenever the camera is loaded with a cassette coded within a predetermined range of movement of the sensing slide, the signal member will remain in this position. However, if the sensing slide moves to its lowermost position shown in FIG. 4, signal control pin 67 on the sensing slide engages lip 68 of the signal member and displaces that member so that the intermediate upper portion 69 thereof is aligned with window 65, such movement of the signal member bringing the word "MAN" into view, as shown in FIG. 6, to alert the operator to the necessity for manually adjusting the exposure control device.

Assuming for illustrative purposes that the symbol "MAN" has appeared in the window as the result of the absence of coding means on a cassette in which the film is of the same speed as that in the coded cassette shown in FIGS. 1 and 2, e.g. ASA 125, it will be apparent that the aperture control ring should be adjusted to the same position shown in FIG. 2. Such adjustment is accomplished by step slide member 71, which is slidably supported by pins 72 and 73 extending through slot 74 and urged toward the inoperative position shown in FIG. 2 by a light coil spring 75. An adjusting link 76 is pivotally attached to control ring 52 and extends upwardly through guide hole 77 directly below the stepped lower edge 78 of slide member 71. When that slide member is in its inoperative position, i.e. when control button 56 or pin 73 is aligned with the corresponding symbol "AUTO," the highest portion of the stepped slide surface is directly above the control link beyond its range of vertical movement. As control button 56 is moved out of its inoperative position, however, progressively lower portions of the stepped slide surface are engaged with the control link to rotate ring 52 in a clockwise direction against the influence of spring 53. Thus, when the control button is aligned with the ASA reference numeral 125 on scale 79, the portion of the stepped slide surface engaged with the control link has adjusted the aperture control ring as shown in FIG. 4, i.e. to the same position shown in FIG. 1. For films of other ASA speed ratings, the aperture is obviously adjusted in the same manner within the range of settings indicated by scale 79. Since the position of control button 56 determines the lens aperture, scale 79 could also include numerals directly indicative of effective aperture sizes, e.g. F stop numerals.

Whenever control button 56 is adjusted manually while code sensing slide 34 is in its lowermost position, spring 53 urges the slightly rounded upper tip of link 76 into contact with the stepped edge surface of slide member 71 with sufficient force to maintain that slide member in its adjusted position against the relatively weak force of spring 75. However, when the cover door is opened to allow the camera to be reloaded, the upward movement of the sensing slide by the latch slide rotates the diaphragm control ring in a clockwise direction against the resistance of spring 53 and withdraws the adjusting link from contact with the step slide. Accordingly, spring 75 moves the step slide back to the position in which its slide button 56 is aligned with the symbol "AUTO," thus restoring the camera to its automatic mode of operation each time a new cassette is to be loaded therein.

Rather than simply adjusting the lens aperture to a predetermined opening, the same mechanism described above could be incorporated in a camera including a photoresponsive automatic exposure control system to adjust that system in accordance with different film speeds. An example of such a system of the so-called masked single vane type is illustrated schematically in FIG. 7 and comprises a galvanometer 81 connected in series with photocell 82 and battery 83 through a variable resistor 84. The armature of the galvanometer supports a vane 85 provided with a cat's eye shaped aperture 86 aligned with lens system 44 and with a mask member 87 which permanently obscures lateral areas of the lens system. As scene illumination increases, the resulting increase in current flow through the galvanometer displaces the vane in a clockwise direction, as viewed in FIG. 7, thereby reducing the effective aperture of the lens system. To correlate the response characteristics of the system with the speed of the film in the camera, the movable contact 88 of variable resistor 84 is attached to control ring 52 so that clockwise movement of that ring will increase the resistance of the variable resistor element and vice versa, thereby effecting the desired relationship between scene illumination and the resulting adjustment of the aperture.

The embodiment of the invention depicted in FIGS. 8 through 11 is embodied in a partially illustrated motion-picture camera including an objective lens system 101 defining an optical axis 102 and a viewfinder system comprising lenses 103 and 104 located along a second optical axis 105.

The film container or magazine 106 adapted to be used in this particular camera comprises a housing 107 enclosing an elongate strip of motion picture film partially visible at 108 through exposure window 109. The magazine is loaded into the camera by being moved forwardly in parallel relation to optical axis 102 to the position shown in solid lines in FIGS. 8, 10 and 11, thereby aligning the exposure window with the objective lens system at a predetermined distance therefrom. When the magazine is so loaded within the camera, the film strip is engaged by a conventional motor driven film advancing mechanism, not shown, which advances it intermittently past window 109 in timed relation to the rotation of shutter blade 111.

The illustrative coding system used to identify the speed of the particular film in the magazine involves notching rib 112 of the magazine housing by progressively removing segments thereof as shown at 113a through 113d to represent corresponding progressively faster film speeds. In other words, a particular relatively slow film speed is characterized by the removal only of segment 113a; a predetermined somewhat faster speed by the removal of both segment 113a and also segment 113b, and so on, thereby allowing four different film speeds to be so coded.

The photoresponsive exposure control system of this camera is also of the masked single vane type, comprising a galvanometer 114 movably supporting a vane 115 provided with a cat's eye shaped aperture 116 aligned with optical axis 102. A photocell 117 is connected to the galvanometer through a switch comprising a fixed contact strip 118 and a flexible contact strip 119, and is illuminated by scene light entering the camera through lens 121 and reflected to the cell by mirror 122 along the optical path represented at 123.

As will be described later, the camera is also provided with a manually operable diaphragm, not shown, which is manually adjustable by rotating objective lens housing 124 to align pointer 125 with the desired aperture opening indicated on scale 126. For automatic operation of the exposure control system, however, housing 124 is rotated to align the pointer with the symbol "AUTO" shown at 127, thereby causing switch finger 128 to raise flexible strip 119 into contact with fixed strip 118 so that the galvanometer will be energized by cell 117. Also, such adjustment of housing 124 opens the manually operable diaphragm to its largest opening so that the effective aperture of the lens system will be determined by the position of vane 115. The galvanometer is adapted to position the enlarged portion of vane aperture 116 in alignment with the objective lens systems when little or no current is passed by the cell and to rotate the vane in a counterclockwise direction as viewed in FIG. 8 in response to increasing current resulting from increasing levels of scene illumination, thus progressively reducing the effective aperture of the lens system.

The mechanism employed to correlate the response of the automatic exposure control system with the coding of the film magazine is similar to that disclosed in commonly assigned U.S. Pat. No. 3,208,363 issued in the names of Donald O. Easterly and David L. Babcock on Sept. 28, 1965. In this mechanism, a pair of transparent neutral density filter members 131 and 132 are carried by respective arms 133 and 134 pivotally mounted on stationary pivot pin 135 and independently biased toward the film magazine by springs 136 and 137. At their upper ends, arms 133 and 134 define corresponding sensing fingers 138 and 139 which are aligned respectively with segments 113b and 113c of magazine rib 112. When either of the fingers is engaged by the magazine rib 112. When either of the fingers is engaged by the magazine rib, i.e. when the corresponding segment of the rib has not been removed, the respective neutral density filter is imposed in the optical path 123 to thereby decrease the illumination of the photocell by a predetermined factor. Accordingly, if the magazine is coded by the removal of only segment 113a, indicating a relatively slow film speed, both of the filters are aligned with the cell as shown in FIG. 8, thereby requiring a correspondingly high level of scene illumination to produce a reduction in the effective aperture of the lends system by means of vane 115. If both segments 113a and 113b are removed, indicating a faster film speed, finger 138 will protrude into the notch in rib 112 and will remove filter 131 from alignment with cell 117 to increase the sensitivity of the galvanometer. Similarly, if segments 113a, 113b, and 113c are all removed, both filters will be removed from the optical path of the cell to provide maximum response of the galvanometer to scene illumination intensity.

If the subject camera were loaded with an uncoded magazine, i.e. one in which rib 112 is completely intact, it is apparent that the exposure control system would nevertheless be adjusted automatically as shown in FIG. 8. Likewise, if the magazine were coded by the removal of all four segments, indicating a relatively fast film speed, the exposure control system would be adjusted automatically to the same condition as if only the uppermost three segments were removed. Therefore, as in the case of the previously described camera the present invention provides a signal device for altering the operator to such an occurrence so that he can properly expose the film by effecting an appropriate manual adjustment of the exposure system.

The signal device comprises a sensing member 141 attached to rod 142 which is pivotally supported in appropriate holes in the depending legs 143 of support member 144. The support member, in turn, is pivotally mounted on stationary pin 145 and is biased by a relatively strong spring 146 to the position shown in FIGS. 8 and 9, in which the lower end of open of the legs is in contact with fixed stop in 147. The end of rod 142 opposite the sensing member 141 extends rearwardly through a vertical slot 148 in guide member 149 and is urged upwardly in the slot by a wear hairpin spring 151. Consequently, the sensing member 141 is supported with its two sensing projections 152 and 153 aligned with and biased toward respective segment areas 113a and 113d of the film magazine, and tends to remain in a vertical position under the yieldable influence of spring 151.

Whenever the sensing member 141 is positioned vertically, as shown in FIGS. 8, 9, and 10, the corresponding horizontal disposition of the portion of rod 142 received by slot 148 causes a signal member 154 at the upper end of the rod to appear in the camera viewfinder. In the illustrated embodiment this signal member comprises a transparent plate bearing the symbol "MAN," to alter the operator that manual adjustment of the camera is required.

When the camera is empty, the elements of the signal device are located as shown in FIG. 9, with the signal member visible in the viewfinder. If the magazine is coded by removal of all four of the rib segments, the sensing projections of the sensing member pass freely through rib 112 as the magazine is moved into loaded position, as depicted in broken lines in FIG. 9, thereby allowing the signal member to remain visible. Likewise, if the magazine is devoid of coding notches along rib 112, both of the sensing projections engage the rib, which displaces the sensing member forwardly without removing the signal from the viewfinder by rocking support member 144 against the resistance of spring 146 as shown in FIG. 10. However, when segment 113a is removed, but not segment 113d, indicating that the magazine is coded to one of the three film speeds compatible with automatic adjustment of the exposure control device, the sensing member tilts as shown in FIG. 11 due to the fact that projection 153 engages rib 112 while projection 152 enters a notch therein. Consequently, the influence of spring 146 on support member 144 causes rod 142 to pivot in the support member by overcoming the light resistance of spring 151, thus lowering the signal member out of alignment with optical axis 105 so that it will not be visible in the viewfinder.

As the operator manually adjusts lens housing 124 in response to the appearance of the signal member in the viewfinder, the resulting downward movement of switch finger 128 opens the photocell circuit so that the widest portion of aperture 116 will be aligned with the objective lens system. Therefore, the manual adjustment of the diaphragm is completely independent of the disabled photoresponsive exposure control system. Simultaneously, the same movement of the lens housing also rotates the upper end of wire member 155 in a counterclockwise direction so that its upper end disengages ear 156 of resilient indicator member 157, which is attached at its opposite end to an immovable position of the camera by rivets 158. As long as the lens housing is adjusted to align pointer 125 with the symbol "AUTO," the wire member maintains the indicator member in the position shown in FIG. 8, in which indicator tongue 159 is not visible in the viewfinder. Upon manual adjustment of the diaphragm, however, the resulting movement of wire member 155 allows the indicator member to flex to a position in which indicator tongue 159 is visible in the upper portion of the viewfinder, thus altering the operator to the fact that the photoresponsive exposure control system is not in operation.

While both of the above-described embodiments of the invention adjust the effective aperture of lens system to regulate film exposure as a function of film speed, it should be apparent that the invention is equally appropriate to other exposure control systems which vary either the shutter speed or the lens aperture or both, either manually or automatically. Also, while the illustrative camera embodiments utilize tactilly coded film containers in cooperation with mechanical code-sensing means, the invention could be applied likewise to cameras using film containers coded in a different manner, for example by means of electrical contacts or resistance elements adapted to correlate the operation of an exposure control system with the type of film in the container. Similarly, it should be understood that the various components which are combined in the above-described embodiments are not limited in novelty or utility to such particular combinations but may be employed advantageously in other types of cameras, either independently or in various combinations or subcombinations with one another.

The invention has been described in detail with particular reference to preferred embodiments thereof, but it will be understood that variations and modifications can be effected within the spirit and scope of the invention as described hereinabove and as defined in the appended claims.

I claim:

1. A camera adapted to be loaded with a film container provided with coding means for indicating the sensitivity of film contained therein, said camera comprising in combination:
   a. an exposure control apparatus adjustable to produce different exposures of film in said camera,
   b. code-sensing means positionable by such coding means of a film container loaded into said camera to automatically adjust said exposure control apparatus as a function of the film sensitivity characterized by such coding means,
   c. manually operable exposure regulating means movable
      1. to a first position to permit such automatic adjustment of said exposure control apparatus to be effected by said code-sensing means and
      2. to any of a plurality of second positions to effect corresponding adjustments of said exposure control system independently of said code sensing means, and
   d. signal means for producing a signal in response to said camera being loaded with a film container devoid of such coding means, and
   e. means responsive to the loading of a film container therein for moving said manually operable exposure regulating means to said first position thereof.

2. A camera adapted to be loaded with a film container provided with tactile code indicia positioned to indicate the sensitivity of film in the container, said camera comprising:
   a. an exposure control apparatus adjustable to produce different exposures of film in the camera;
   b. code-sensing means including a member having at least two projections engageable with the code indicia of such a film container loaded in the camera for translatably and rotatably positioning the member as a function of the film sensitivity characterized by the code indicia;
   c. means for automatically adjusting said exposure control apparatus in response to movement of said code-snesing member;
   d. means associated with said code-sensing means for producing a signal indicative of the presence or absence of such code indicia on such a cartridge loaded in the camera; and
   e. alternative exposure regulating means manually movable to a first position to permit automatic adjustment of the exposure control member by the code sensing means, and to any of a plurality of second positions to effect corresponding adjustment of said exposure control system independently of said code-sensing means.